United States Patent
Maislos et al.

(10) Patent No.: US 9,342,346 B2
(45) Date of Patent: May 17, 2016

(54) LIVE MIGRATION OF VIRTUAL MACHINES THAT USE EXTERNALIZED MEMORY PAGES

(71) Applicant: Strato Scale Ltd., Herzlia (IL)

(72) Inventors: Ariel Maislos, Bnei Tzion (IL); Etay Bogner, Tel Aviv (IL); Muli Ben-Yehuda, Haifa (IL); Shlomo Matichin, Petach Tikva (IL); Benoit Guillaume Charles Hudzia, Belfast (GB); Rom Freiman, Givatayim (IL)

(73) Assignee: STRATO SCALE LTD., Herzlia (IL)

( * ) Notice: Subject to any disclaimer, the term of this patent is extended or adjusted under 35 U.S.C. 154(b) by 43 days.

(21) Appl. No.: 14/341,813

(22) Filed: Jul. 27, 2014

(65) Prior Publication Data

US 2016/0026489 A1 Jan. 28, 2016

(51) Int. Cl.
*G06F 9/455* (2006.01)
*G06F 15/167* (2006.01)

(52) U.S. Cl.
CPC .......... *G06F 9/45558* (2013.01); *G06F 15/167* (2013.01); *G06F 2009/4557* (2013.01); *G06F 2009/45583* (2013.01); *G06F 2009/45595* (2013.01)

(58) Field of Classification Search
None
See application file for complete search history.

(56) References Cited

U.S. PATENT DOCUMENTS

| | | | |
|---|---|---|---|
| 6,148,377 A | 11/2000 | Carter et al. | |
| 6,571,288 B1 | 5/2003 | Sarukkai | |
| 6,591,355 B2 | 7/2003 | Schuster et al. | |
| 6,823,429 B1 | 11/2004 | Olnowich | |
| 7,162,476 B1 | 1/2007 | Belair et al. | |
| 8,082,400 B1 | 12/2011 | Chang et al. | |
| 8,266,238 B2 | 9/2012 | Zimmer et al. | |
| 8,352,940 B2 | 1/2013 | Pafumi et al. | |
| 8,544,004 B2 | 9/2013 | Fultheim et al. | |
| 2007/0250838 A1 | 10/2007 | Belady et al. | |
| 2008/0059556 A1* | 3/2008 | Greenspan | G06F 9/5077 709/201 |
| 2009/0204718 A1 | 8/2009 | Lawton et al. | |
| 2011/0072234 A1 | 3/2011 | Chinya et al. | |
| 2011/0078112 A1* | 3/2011 | Takata | G06F 17/30156 707/622 |
| 2011/0099318 A1 | 4/2011 | Hudzia et al. | |
| 2011/0131568 A1 | 6/2011 | Heim | |
| 2012/0005556 A1* | 1/2012 | Chang | G06F 12/1009 714/758 |
| 2012/0011504 A1 | 1/2012 | Ahmad et al. | |
| 2013/0086235 A1 | 4/2013 | Ferris | |

(Continued)

OTHER PUBLICATIONS

Mitzenmacher et al., "The Power of Two Random Choices: Survey of Techniques and Results", Handbook of Randomized Computing, pp. 255-312, year 2000.

(Continued)

*Primary Examiner* — Craig Dorais
(74) *Attorney, Agent, or Firm* — D.KLIGLER IP SERVICES LTD.

(57) ABSTRACT

A method includes running a Virtual Machine (VM) on a first compute node in a plurality of compute nodes that communicate with one another over a communication network. The VM is migrated from the first compute node to a second compute node in the plurality by generating, for memory pages accessed by the VM, page transfer state of one or more local memory pages that are accessed locally on the first compute node, and of one or more externalized memory pages whose access is not confined to the first node. Based on the page transfer state, the migrated VM is provided with access to the memory pages, including both the local and the externalized memory pages, on the second compute node.

15 Claims, 7 Drawing Sheets

(56) References Cited

U.S. PATENT DOCUMENTS

2013/0249925 A1    9/2013  Ginzburg
2014/0196037 A1    7/2014  Gopalan

OTHER PUBLICATIONS

Hudzua et al., "Memory Aggregation for KVM", 41 pages, KVM forum, Nov. 2012.
VMware Virtualization, 8 pages, year 2014.
Ben-Yehuda et al., U.S. Appl. No. 14/260,304, filed Apr. 24, 2014.
Ben-Yehuda et al., U.S. Appl. No. 14/181,791, filed Feb. 17, 2014.
Ori, Zivan, U.S. Appl. No. 14/333,521, filed Jul. 17, 2014.
Dafni et al., U.S. Appl. No. 14/675,844, filed Apr. 1, 2015.
International Application # PCT/IB2014/067329 Search Report dated Apr. 28, 2015.
Clark et al., "Live Migration of Virtual Machines", Proceedings of the 2nd conference on Symposium on Networked Systems Design & Implementation, vol. 2, USENIX Association, pp. 273-286, May 31, 2005.
Jo et al., "Efficient Live Migration of Virtual Machines Using Shared Storage", ACM Sigplan Notices, vol. 48, No. 7, pp. 41-50, Mar. 31, 2013.
Maislos et al., U.S. Appl. No. 14/341,813, filed Jul. 27, 2014.
International Application # PCT/IB2015/052178 dated Sep. 9, 2015.

\* cited by examiner

LIVE MIGRATION OF VIRTUAL MACHINES THAT USE EXTERNALIZED MEMORY PAGES

FIELD OF THE INVENTION

The present invention relates generally to computing systems, and particularly to methods and systems for live migration of virtual machines.

BACKGROUND OF THE INVENTION

Machine virtualization is commonly used in various computing environments, such as in data centers and cloud computing. Various virtualization solutions are known in the art. For example, VMware, Inc. (Palo Alto, Calif.), offers virtualization software for environments such as data centers, cloud computing, personal desktop and mobile computing.

SUMMARY OF THE INVENTION

An embodiment of the present invention that is described herein provides a method including running a Virtual Machine (VM) on a first compute node in a plurality of compute nodes that communicate with one another over a communication network. The VM is migrated from the first compute node to a second compute node in the plurality by generating, for memory pages accessed by the VM, page transfer state of one or more local memory pages that are accessed locally on the first compute node, and of one or more externalized memory pages whose access is not confined to the first node. Based on the page transfer state, the migrated VM is provided with access to the memory pages, including both the local and the externalized memory pages, on the second compute node.

In some embodiments, generating the page transfer state includes assigning for each memory page a state selected from a group of states consisting of a DIRTY state for a local page that has changed or for an externalized page that has been retrieved back to the first compute node after the page has been transferred to the second compute node, an EXTERNALIZED state for a page that resides outside the first compute node, and a TRANSFERRED state for a page that has been successfully transferred to the second compute node.

In an embodiment, migrating the VM includes transferring from the first compute node to the second compute node contents or unique identifiers of the local memory pages, and unique identifiers of the externalized memory pages. In another embodiment, migrating the VM includes transferring the contents or unique identifiers of the local memory pages, and the unique identifiers of the externalized memory pages while the VM is running. In yet another embodiment, migrating the VM includes transferring the unique identifiers of the externalized memory pages after stopping the VM on the first compute node, and transferring remaining memory pages after starting a migrated instance of the VM on the second compute node.

In some embodiments, transferring the remaining memory pages includes requesting the remaining memory pages in response to page-fault events occurring in the second compute node. In other embodiments, transferring the remaining memory pages includes transferring the remaining memory pages in a background process. In yet other embodiments, migrating the VM includes transferring at least part of the page transfer state from the first compute node to the second compute node before stopping the VM.

In an embodiment, migrating the VM includes transferring at least some of the memory pages while the VM is running on the first compute node, and transferring remaining externalized pages before starting a migrated instance of the VM on the second compute node. In another embodiment, migrating the VM includes transferring at least some of the contents or unique identifiers of the local memory pages, and unique identifiers of the externalized memory pages, using at least one of a push background process in the first compute node and a pull background process in the second compute node.

There is additionally provided, in accordance with an embodiment of the present invention, apparatus including a plurality of compute nodes that communicate with one another over a communication network, including at least first and second compute nodes including respective processors. The processors are configured to run a Virtual Machine (VM) on the first compute node and to migrate the VM from the first compute node to the second compute node, by generating, for memory pages accessed by the VM, page transfer state of one or more local memory pages that are accessed locally on the first compute node, and of one or more externalized memory pages whose access is not confined to the first node, and, based on the page transfer state, to provide for the migrated VM access to the memory pages, including both the local and the externalized memory pages, on the second compute node.

There is additionally provided, in accordance with an embodiment of the present invention, a software product, the product including a tangible non-transitory computer-readable medium in which program instructions are stored, which instructions, when read by processors of first and second compute nodes that communicate with one another over a communication network, cause the processors to run a Virtual Machine (VM) on the first compute node and to migrate the VM from the first compute node to the second compute node, by generating, for memory pages accessed by the VM, page transfer state of one or more local memory pages that are accessed locally on the first compute node, and of one or more externalized memory pages whose access is not confined to the first node, and, based on the page transfer state, providing for the migrated VM access to the memory pages, including both the local and the externalized memory pages, on the second compute node.

There is additionally provided, in accordance with an embodiment of the present invention, a method including running multiple compute nodes that communicate with one another over a communication network, including at least first and second compute nodes. After migrating a Virtual Machine (VM) running on the first compute node to the second compute node, page state information that identifies de-duplicated pages that have been retrieved back to the first compute node during migration of the VM, is received from the first compute node. The page state information is used, irrespective of any additional indications from other compute nodes, for de-duplicating the identified pages in the second compute node.

There is additionally provided, in accordance with an embodiment of the present invention, a system that includes a plurality of compute nodes that communicate with one another over a communication network, including at least first and second compute nodes including respective processors. After migrating a Virtual Machine (VM) running on the first compute node to the second compute node, the processor of the second compute node is configured to receive from the processor of the first compute node page state information that identifies de-duplicated pages that have been retrieved back to the first compute node during migration of the VM, and, using the page state information and irrespective of any additional indications from other compute nodes, to de-duplicate the identified pages in the second compute node.

The present invention will be more fully understood from the following detailed description of the embodiments thereof, taken together with the drawings in which:

DETAILED DESCRIPTION OF EMBODIMENTS

Overview

Figure 1:
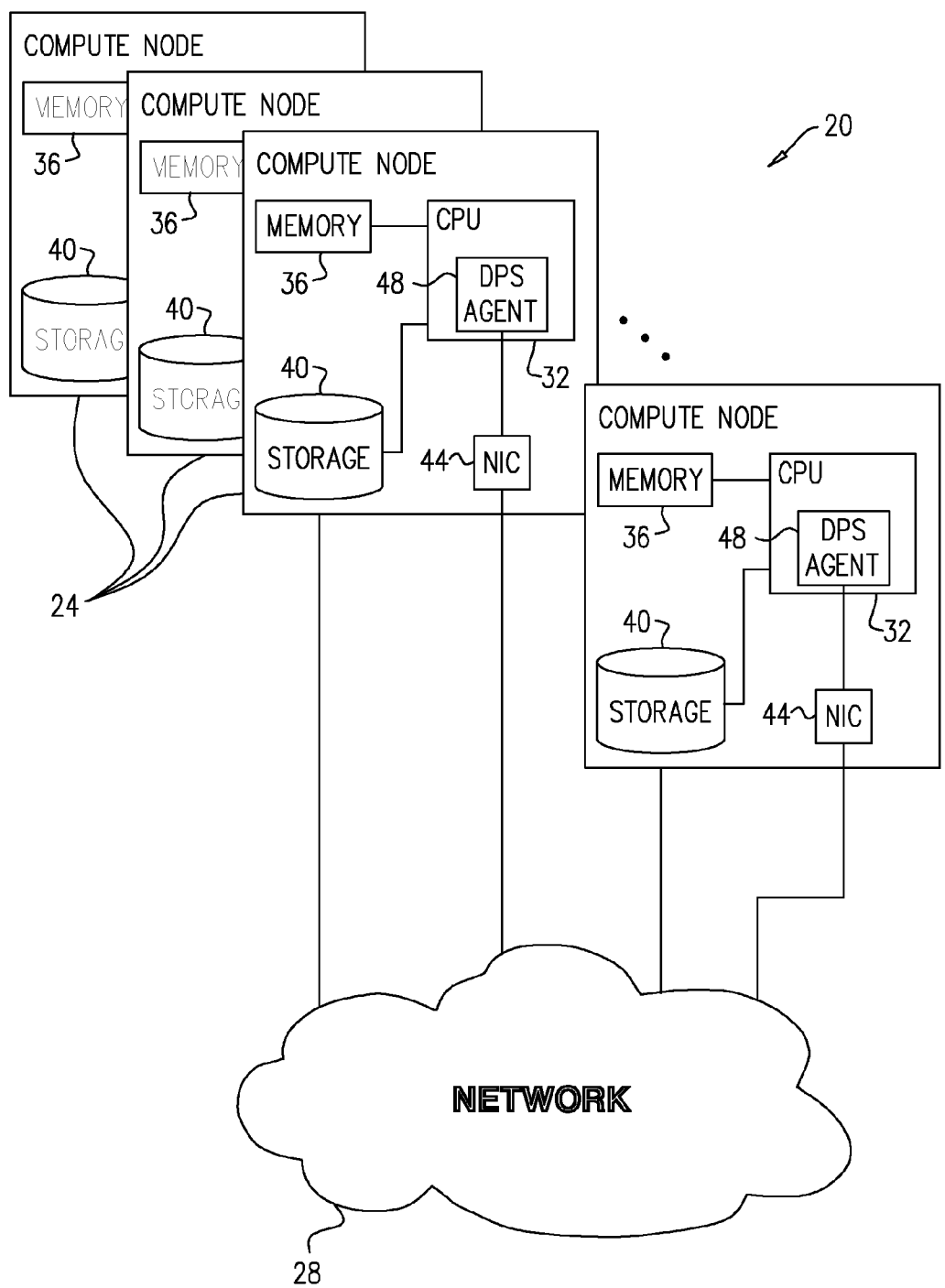
FIG. 1 is a block diagram that schematically illustrates a cluster of compute nodes, in accordance with an embodiment of the present invention.

Live migration of a virtual machine (VM) typically involves copying the full state of the machine to another compute node with minimal disruption to the applications served by the VM. The original and migrated instances of the VM run on respective source and destination compute nodes, and are referred to as the source and destination VMs, respectively. Compute nodes are also referred to simply as "nodes" for brevity.

Embodiments of the present invention that are described herein provide improved methods and systems for VM live migration. In the description that follows we assume a basic storage unit, which is referred to as a memory page. In some embodiments, a computing system comprises multiple nodes that are connected by a communication network. Each node is configured to run one or more VMs. Such a computing system is also referred to as a node cluster. To efficiently use the system memory resources, memory pages may be shared or otherwise distributed among the different compute nodes. Thus, a VM running on a given compute node may access memory pages stored locally on the same node, as well as memory pages that reside on other compute nodes.

A memory page that is accessed by a VM on a given node but is stored on a different node is referred to herein as an externalized page. For example, in order to relieve memory pressure, duplicate copies of a memory page can be de-duplicated, i.e., discarded to retain only a small number of duplicate copies across the node cluster. As another example, local memory pressure can be resolved by remote-swapping (e.g., moving out) local memory pages (e.g., pages that are rarely accessed) to other compute nodes having available storage space. Additionally or alternatively to de-duplicated and remote-swapped pages, the disclosed techniques can use pages that have been externalized in any other suitable way and for any other reason. A compute node can retrieve the externalized pages of a given VM back, using unique identifiers that are assigned to the externalized pages. The retrieval of externalized pages is referred to as a "page in" operation.

In VM live migration, both local and externalized memory pages that the source VM accesses should be accessible to the migrated instance of the VM on the destination compute node. Note that a memory page that is local with respect to the source node can migrate to a respective page that appears externalized with respect to the destination node, and vice versa.

As will be explained below, the migration of an externalized page typically involves transferring only a respective page identifier rather than the page content. Although in some of the disclosed embodiments the migration of local pages involves transferring the page content, in alternative embodiments at least some of the local pages may be migrated by transferring unique identifiers of the local pages instead of their contents, in which case the local pages become externalized with respect to the destination VM.

In some embodiments, local memory pages are migrated by copying the content of the pages from the source node to the destination node. To transfer an externalized page, it is possible in principle to first retrieve the content of the externalized page back to the source node, and then copy the retrieved page to the destination node. This approach, however, is highly inefficient since it involves unnecessary page copy operations that increase network traffic and incur high latency. Moreover, transferring externalized pages that were retrieved into local pages, in addition to the local pages, may result in memory pressure at the destination node and require unnecessary post migration operations of de-duplication and/or remote-swapping.

In example embodiments that are disclosed below, a migration procedure migrates local memory pages by copying the content of the pages, and externalized pages by transferring unique page identifiers of the externalized pages. In other embodiments, at least some of the local pages can be migrated by transferring their unique identifiers rather than their contents.

In some embodiments, when the VM migration completes, the destination VM replaces the source VM. In other words, at some point during the process of migration the source VM stops and the destination VM is activated. In the description that follows, we describe various embodiments that employ different approaches to reduce the downtime period during which the source VM is already stopped and the destination VM is not yet activated: (i) pre-copy live migration—transfer memory pages while the source VM is still running and activate the destination VM after the full state is transferred, (ii) post-copy live migration—activate the destination VM after stopping the source VM and transferring part of the source VM state, and transfer the remaining VM state as a background process and by the destination VM requesting missing memory pages, and (iii) hybrid live migration—combined pre-copy and post-copy live migration.

In the disclosed embodiments, the migration procedure transfers memory pages based on dynamic page state or transfer state of one or more local memory pages that are accessed locally on the source compute node, and of one or more externalized memory pages whose access is not local to the first node. The page transfer state identifies memory pages that have changed after they have been migrated to the destination node, and should be therefore re-transferred. In some embodiments, the page transfer state is selected from among the states: DIRTY, EXTERNALIZED, and TRANSFERRED, and is stored, per page, in a page state bitmap (PSB).

A DIRTY page refers to a page that was modified (e.g., by the still running source VM) after the page has been transferred to the destination node, i.e., a local page whose content was modified, or an externalized page that was retrieved back in. An EXTERNALIZED page refers to a page that resides on a node other than the source node, and a TRANSFERRED page is a page (local or externalized) that has already been successfully transferred to the destination node.

In some of the disclosed embodiments, the source and/or destination node scans the states of the memory pages in the PSB. Based on the PSB states, local pages are transferred by copying their content to the destination node, and externalized pages are transferred by transferring only their (typically much shorter) unique identifiers. Moreover, pages that have already been transferred, but turned DIRTY or EXTERNALIZED while the source VM is still running, are re-transferred. Alternatively, page externalizing is disabled during migration.

In some embodiments that implement post-copy or hybrid live migration, the destination VM starts after partial migration that transfers local and externalized pages. Following this partial migration, the activated destination VM may encounter missing pages creating page-fault events while executing the customer applications. The destination VM requests missing pages, or pages whose state in the PSB equals DIRTY or EXTERNALIZED, from the source node. After receiving state information that is related to an externalized page in response to a page-fault event, the hypervisor in the destination VM may re-throw or re-execute a respective content retrieval operation based on the received page state.

In a variant embodiment of the post-copy live migration procedure, the source VM, before stopping, gathers page information in the PSB regarding the externalized pages, and transferred the PSB to the destination node. The destination node scans the PSB and handles the externalized pages accordingly.

In some embodiments, the source VM is first migrated by transferring the content of both the local and externalized pages. As explained above, this may result in memory pressure at the destination VM. In an embodiment, the source VM generates a PSB that marks de-duplicated pages as they are retrieved back prior to migration. The destination VM receives the PSB and performs efficient local de-duplication, without sharing other cluster nodes in the process.

In the disclosed techniques, the VM live migration procedures use page information that includes identification of externalized pages. This technique enables to transfer the unique identifiers of the externalized pages rather than the (typically much larger) content of the pages. Such migration procedures avoid unnecessary page transfer operations, as well as post migration de-duplicate and remote-swap operations. As such, the disclosed techniques reduce network traffic, CPU load and memory pressure. Additionally, the migration procedures generally do not alter the distribution of shared memory pages across the node cluster, and therefore do not cause new memory pressure events.

System Description

FIG. 1 is a block diagram that schematically illustrates a computing system 20, which comprises a cluster of multiple compute nodes 24, in accordance with an embodiment of the present invention. System 20 may comprise, for example, a data center, a cloud computing system, a High-Performance Computing (HPC) system or any other suitable system.

Compute nodes 24 (referred to simply as "nodes" for brevity) typically comprise servers, but may alternatively comprise any other suitable type of compute nodes. System 20 may comprise any suitable number of nodes, either of the same type or of different types. Nodes 24 are connected by a communication network 28 serving for intra-cluster communication, typically a Local Area Network (LAN). Network 28 may operate in accordance with any suitable network protocol, such as Ethernet or Infiniband.

Each node 24 comprises a Central Processing Unit (CPU) 32. Depending on the type of compute node, CPU 32 may comprise multiple processing cores and/or multiple Integrated Circuits (ICs). Regardless of the specific node configuration, the processing circuitry of the node as a whole is regarded herein as the node CPU. Each node further comprises a memory 36 (typically a volatile memory such as Dynamic Random Access Memory—DRAM) and a Network Interface Card (NIC) 44 for communicating with network 28. Some of nodes 24 (but not necessarily all nodes) comprise a non-volatile storage device 40 (e.g., a magnetic Hard Disk Drive—HDD—or Solid State Drive—SSD).

Nodes 24 typically run Virtual Machines (VMs) that in turn run customer applications. In some embodiments, a VM that runs on a given node accesses memory pages that are stored on multiple nodes. For the purpose of sharing memory resources among nodes 24, the CPU of each node runs a Distributed Page Store (DPS) agent 48. DPS agents 48 in the various nodes communicate with one another over network 28 for coordinating storage of memory pages, as will be explained in detail below.

The multiple DPS agents are collectively referred to herein as a "DPS network." Alternatively or additionally, system 20 may manage the memory sharing among nodes 24 using any suitable method, such as, for example, a centralized entity in the network. Although in the description that follows we assume that system 20 manages memory sharing using a DPS network, in alternative embodiments system 20 can use any other suitable architecture and protocols instead of, or in addition to, the DPS network.

Further aspects of resource sharing for VMs over a cluster of compute nodes are addressed in U.S. patent application Ser. Nos. 14/181,791 and 14/260,304, which are assigned to the assignee of the present patent application and whose disclosures are incorporated herein by reference.

The system and compute-node configurations shown in FIG. 1 are example configurations that are chosen purely for the sake of conceptual clarity. In alternative embodiments, any other suitable system and/or node configuration can be used. The various elements of system 20, and in particular the elements of nodes 24, may be implemented using hardware/firmware, such as in one or more Application-Specific Integrated Circuit (ASICs) or Field-Programmable Gate Array (FPGAs). Alternatively, some system or node elements, e.g., CPUs 32, may be implemented in software or using a combination of hardware/firmware and software elements. In some embodiments, CPUs 32 comprise general-purpose processors, which are programmed in software to carry out the functions described herein. The software may be downloaded to the processors in electronic form, over a network, for example, or it may, alternatively or additionally, be provided and/or stored on non-transitory tangible media, such as magnetic, optical, or electronic memory.

Sharing Memory Resources

Memories 36 store data for the various VMs in a basic storage unit, which is referred to herein as a memory page. A VM that runs on a given compute node may access memory pages that are stored locally on memory 36 of the same compute node, or on memories 36 of other compute nodes. A memory page whose content is available locally is referred to herein as a "local page". A memory page whose content resides on another compute node is referred to as an "externalized page". A VM can access externalized pages, e.g., via the DPS network using unique page identifiers. Local memory pages may be externalized to resolve global and/or local memory pressure as described herein.

In some embodiments, the DPS network resolves memory pressure conditions in nodes 24 by running a cluster-wide de-duplication process. In many practical cases, different VMs running on different nodes use memory pages having the same content. For example, when running multiple instances of a VM on different nodes, the memory pages containing the VM kernel code will typically be duplicated multiple times across the node cluster.

In some scenarios it may be advantageous to retain only a small number of copies of such a page, make these copies available to all relevant VMs, and delete the superfluous copies. The minimal number of duplicate page copies retained may depend on fault tolerance considerations. This process is referred to as de-duplication. As can be appreciated, de-duplication enables nodes to free local memory and thus relieve memory pressure.

In some cases, the de-duplication process deletes all the copies of a certain page that is used by at least one VM in a given node. As a result, the page becomes externalized and a local VM would be able to access the page using a unique identifier such as a hash value computed over the page content, or using any other suitable fingerprint identifier. The unique identifier of an externalized de-duplicated page is also referred to as fingerprint identifier (FID).

Another cluster-wide process to resolve memory pressure is referred to as remote-swap. In this process, the DPS network moves a memory page from memory 36 of a first node (which experiences memory pressure) to memory 36 of a second node (which has available memory resources). The second node may store the page in compressed form. If the memory pressure is temporary, the swapped page may be returned to the original node at a later time. Externalized pages that were moved to another compute node can be accessed, e.g., via the DPS network, using a unique identifier (UID).

Various methods for managing memory sharing including methods for de-duplication and remote-swapping of memory pages are described, for example in U.S. application Ser. No. 14/181,791, cited above.

Elements of VM Live Migration

Figure 2:
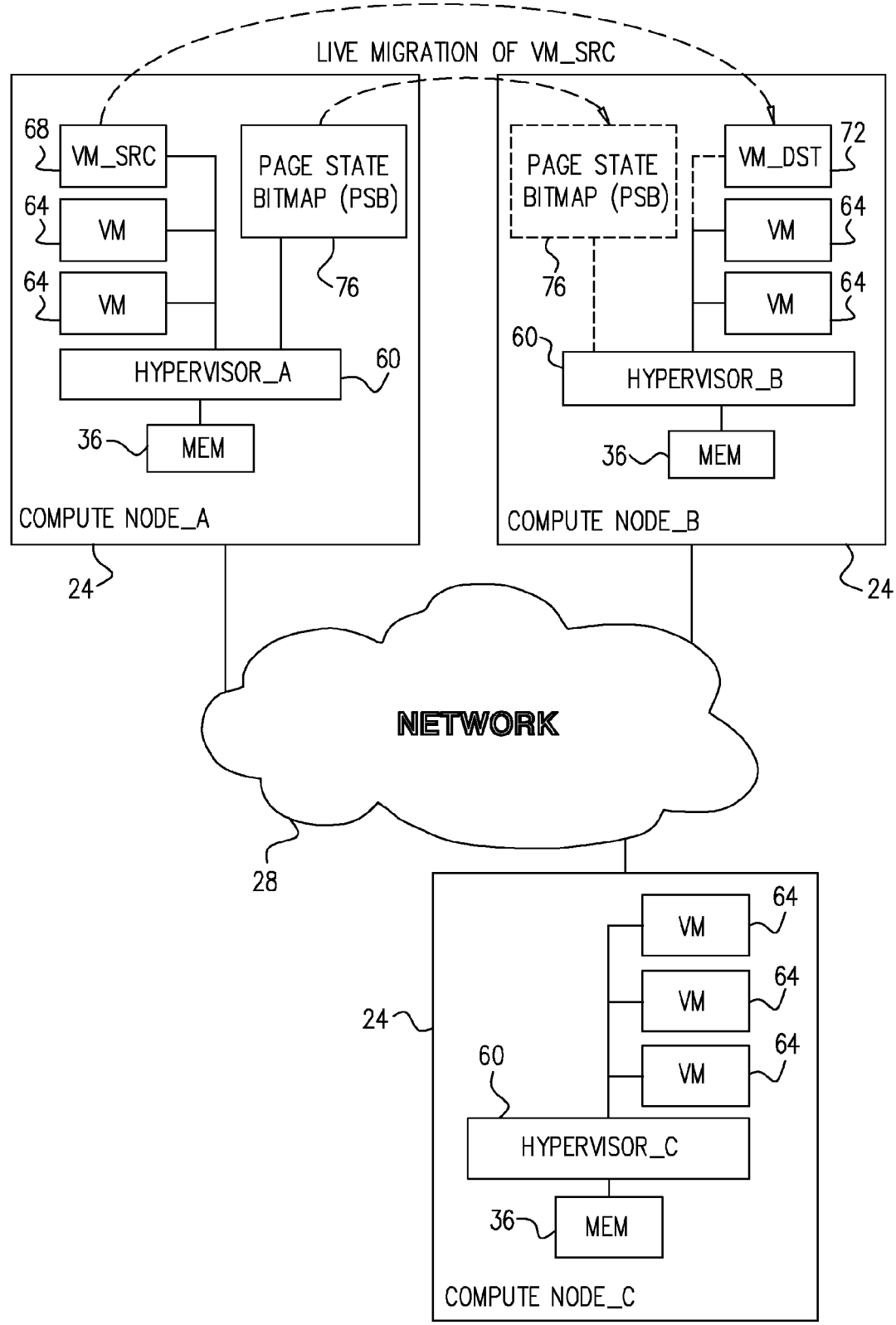
FIG. 2 is a diagram that schematically illustrates Virtual Machine (VM) live migration, in accordance with an embodiment of the present invention.

FIG. 2 is a diagram that schematically illustrates live migration of a virtual machine, in accordance with an embodiment of the present invention. The three compute nodes 24 in FIG. 2, namely NODE_A, NODE_B and NODE_C may be part of system 20 of FIG. 1 above. In the present example, in each compute node 24, a hypervisor 60 runs one or more local VMs 64 and provides the local VMs with resources such as memory, storage and CPU resources.

In the present example, NODE_A additionally runs a virtual machine VM_SRC 68 that should be migrated to NODE_B. In the description that follows, the node that runs the pre migrated VM, and the target node to which the VM migrates, are referred to as source and destination nodes, respectively. Similarly, components internal to the source and destination nodes are also respectively referred to as source and destination components.

Thus, in the example of FIG. 2, VM_SRC is a source VM running on a source node NODE_A. In addition, VM_DST 72 is a destination VM, which is a migrated instance of VM_A running on NODE_B, which is the destination node. Similarly, hypervisors 60 and memories 36 of the source and destination nodes are referred to as source and destination hypervisors or memories, respectively.

Live migration involves the transfer of a running source VM to a destination node without terminating the customer application. During migration, the full state of the source VM, including CPU and I/O states, memory, storage, and network connectivity are transferred to the destination node. In particular, local and externalized memory pages are transferred, as described below.

The procedure of live migration is typically carried out by the source and destination hypervisors, possibly in combination with a centralized entity. Alternatively, live migration can be managed by a distributed entity such as the DPS network. In some embodiments, local memory pages that are used by the source VM are transferred to the destination node by copying the content of the pages. In one embodiment, to handle externalized pages, the migration procedure first retrieves the externalized pages back to the source node, and then copies the content of the pages to the destination node. Such an approach, however, may create unnecessary page transfers (first to the source node, and then to the destination node), which increases network traffic, latency, memory pressure and CPU workload. Moreover, since the procedure transfers the content of both the local and externalized pages to the destination node, this may increase the memory pressure at the destination node, which may result in additional de-duplication and/or remote-swapping of memory pages at the destination node.

In some embodiments, local and externalized pages of the source VM migrate to respective local and externalized pages in the destination VM. For example, VM_SRC may access pages in memory 36 of NODE_A, as well as externalized memory pages that reside on memory 36 of any other node in system 20, such as NODE_B, NODE_C or both. When the migration of VM_SRC to NODE_B completes, pages that VM_SRC accessed locally may be accessed locally by VM_DST, or alternatively may become externalized with respect to VM_DST. In addition, pages that were accessed as externalized by VM_SRC should also be accessed as externalized by VM_DST. Such a migration procedure refrains from performing unnecessary operations of page content transfers, de-duplication and remote-swapping.

In some live migration scenarios, memory pages are transferred while the source VM is still running. As a result, the still running source VM may modify local pages that have already been transferred. In addition, an already transferred local page may later undergo de-duplication or remote-swapping (i.e., being externalized), and externalized pages that have already been transferred may be retrieved back locally. Such post transfer page modifications disrupt the reliability of the VM migration, and therefore modified pages should be retransferred.

In the description that follows, the term "dirty page" refers to: i) a local page that has been modified after the page has been transferred to the destination node, and ii) an externalized page that has been retrieved back to the source VM after the page has been transferred to the destination node.

In some embodiments, the migration procedure iteratively transfers the memory pages in one or more transfer rounds.

Such a procedure is also referred to as an iterative copy phase. In the first round, the procedure transfers the content of the local pages and the identifiers of the externalized pages used by the source VM. In subsequent rounds, the migration procedure additionally transfers pages whose state has changed to DIRTY or EXTERNALIZED during previous rounds.

In the disclosed embodiments, the source hypervisor generates page information or state that includes marking externalized pages. This marking enables to transfer only the identifier of an externalized page rather than the (typically much larger) content of the page. Note that an externalized page at the source VM may become local at the destination node if the page already resides at the destination memory prior to the migration.

In several disclosed embodiments, the memory pages to be transferred are each assigned a respective transfer state:

DIRTY—the source node should resend the content of the page and change the page state to TRANSFERRED.

EXTERNALIZED—the source node should resend the identifier of the page and change the page state to TRANSFERRED.

TRANSFERRED the page has already been transferred, or the source VM never accesses the page, and therefore there is no need to send the page.

In some embodiments, source hypervisor 60 generates a page state bitmap (PSB) 76 that holds page information. The page information includes the page state of the memory pages, e.g., a triple valued state as described above. The source hypervisor typically sends the PSB to the destination node before the first round, and sends updated versions of the PSB between subsequent rounds, if necessary. The destination node uses the PSB to retrieve and restore the content of local pages and the identifiers of externalized pages.

The source hypervisor can use any suitable method to generate the PSB. In an example embodiment, the source hypervisor initially sets the state of the memory pages to DIRTY. Then the hypervisor scans the memory pages and replaces the state of relevant pages to EXTERNALIZED or to TRANSFERRED, based on the true page state.

During the execution of the transfer rounds, and possibly between rounds, the source hypervisor updates the PSB on the fly (e.g., incrementally). For example, to prevent unnecessary resending of pages in subsequent rounds, the source hypervisor sets the PSB state of resent dirty and externalized pages to TRANSFERRED.

In addition, the source hypervisor monitors the state of the memory pages to detect any page modifications that may have occurred after page transfer, and updates the PSB accordingly. For example, when the source VM is still running, an already transferred page may become dirty or externalized and its state should therefor change from TRANSFERRED to DIRTY or EXTERNALIZED, respectively. In some embodiments, the migration procedure does not allow to externalize pages during the migration process.

The source hypervisor can use any suitable method to decide how many transfer iterations to execute during the iterative copy phase. For example, in some embodiments, the source hypervisor terminates the iterative copy phase when the number of pages that are sent per iteration reduces below a predefined threshold.

In an embodiment, the source node extracts the identifiers of (some or all of) the externalized pages, and transfers the identifiers to the destination node in the PSB. In another embodiment, the destination node requests the identifiers of individual externalized pages as required (e.g., in response to a page-fault event.) In the embodiments described below, it assumed that the destination hypervisor has access to updated states of the memory pages, e.g., by sending the updates PSB from the source node to the destination node, or via the DPS network.

Pre-Copy Live Migration

Figure 3:
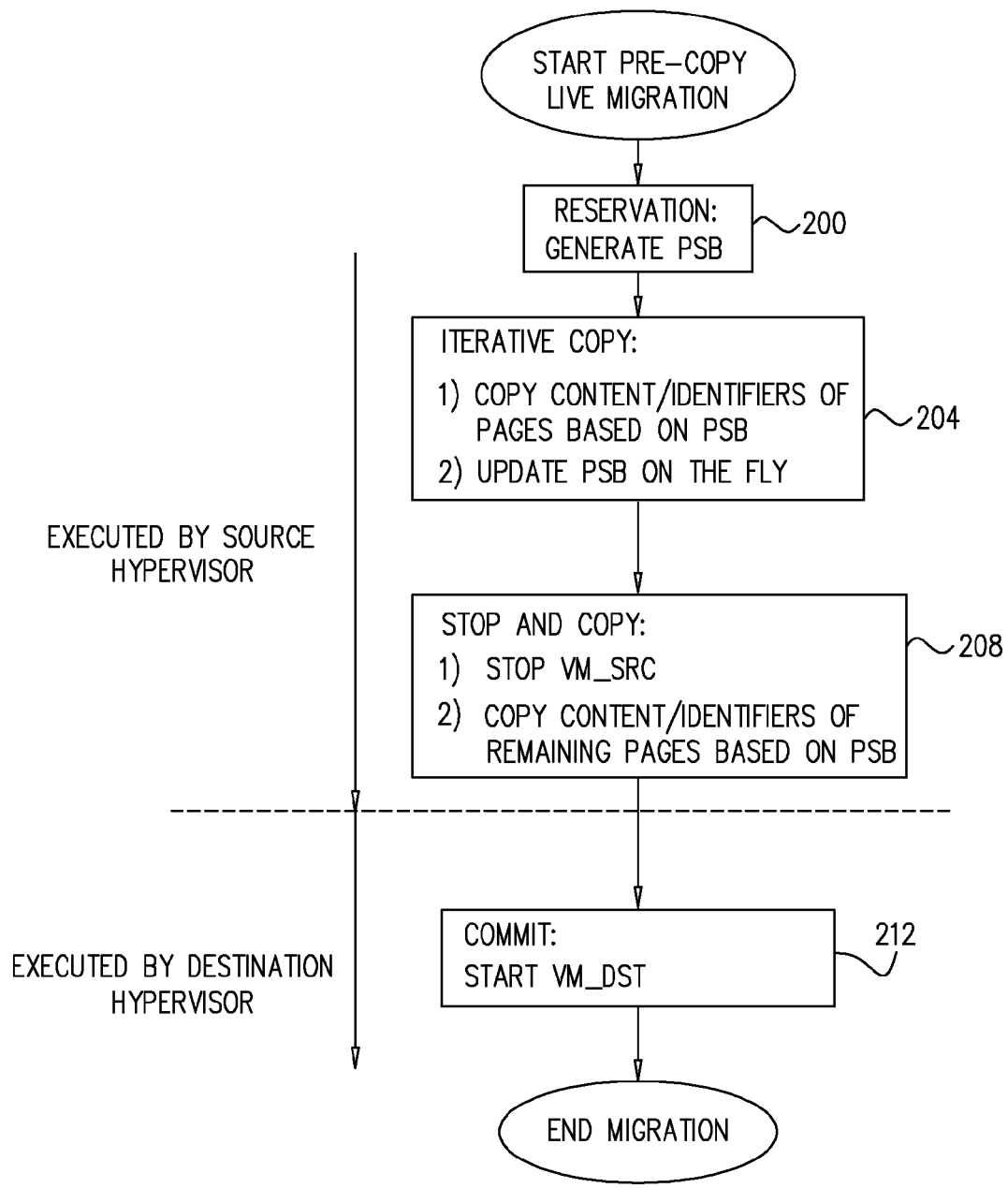
FIG. 3 is a flow chart that schematically illustrates a method for pre-copy live migration of a virtual machine, in accordance with an embodiment of the present invention.

FIG. 3 is a flow chart that schematically illustrates a method for pre-copy live migration of a virtual machine, in accordance with an embodiment of the present invention. The method begins with source hypervisor 60 generating the PSB structure, as described above, at a pre-copy PSB generation step 200.

At a pre-copy iterative-copy step 204, the source hypervisor performs one or more transfer iterations. The source hypervisor scans the PSB, extracts the respective page state, and transfers the memory pages according to their state as described above. Pages whose state equals TRANSFERRED are ignored. The source hypervisor updates the PSB on the fly so that pages that became dirty or externalized during previous iterations will be resent to the destination node.

At a pre-copy stop-and-copy step 212, the source hypervisor stops the source VM. As a result, the source VM freezes any further modifications to its memory pages. The source hypervisor then performs an additional round to transfer the remaining pages according to the updated page states in the PSB. Further at step 208, after stopping the source VM, the source hypervisor transfers the CPU and I/O states of VM_SRC 68 to NODE_B to be used as initial sates by VM_DST 72.

In one embodiment, during step 208, none of the local VMs and/or the DPS network, are allowed to change any of the memory pages accessed by the source node. In another embodiment, if during step 208, the states of the pages change, the migration procedure coordinates to reflect this change at the destination node.

Following step 208, the transfer of the full source VM state is completed, and the destination hypervisor starts executing the migrated VM_DST 72, at a pre-copy commitment step 212, and the method then terminates.

Post-Copy Live Migration

Figure 4:
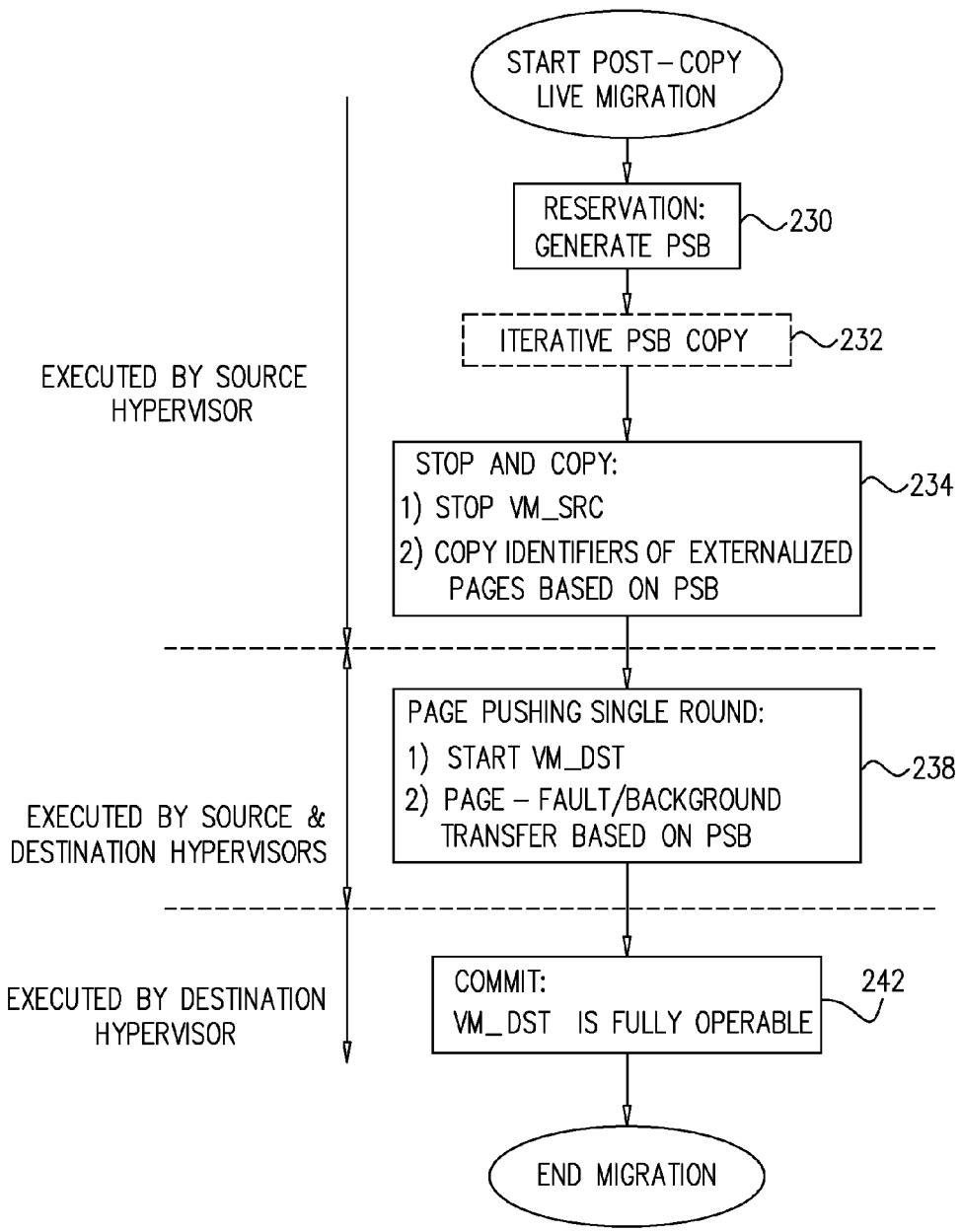
FIG. 4 is a flow chart that schematically illustrates a method for post-copy live migration of a virtual machine, in accordance with an embodiment of the present invention.

FIG. 4 is a flow chart that schematically illustrates a method for post-copy live migration of a virtual machine, in accordance with an embodiment of the present invention. The method begins with source hypervisor 60 generating the PSB structure, at a post-copy PSB generation step 230, similarly to step 200 above. An iterative PSB copy step 232 is optional and is described below in an enhanced variant of the post-copy migration method.

In contrast to the embodiment of FIG. 3 above, in which the transfer of pages occur while the source VM is still running, in the present embodiment the source hypervisor first stops the source VM at a post-copy stop-and-copy step 234. At step 234, after stopping the source VM, the source hypervisor transfers the CPU and I/O states of the source node, and additionally uses the PSB to identify externalized pages and transfers the identifiers of the externalized pages to the destination node.

Following step 234, the CPU and I/O states, and at least part of the memory pages (i.e., the respective identifiers of the externalized pages) of the source VM have already been migrated, and the destination hypervisor starts executing the migrated VM, at a post-copy page pushing step 238. Since there may still pages that have not been transferred yet, however, the destination VM may attempt to access missing pages, which in turn creates page-fault events. In response to a page-fault, the destination hypervisor requests the respective missing page from the source node. In some embodiments, at step 238 the source hypervisor continues to transfer memory pages to the destination node, as a background process.

In some embodiments, one or more pages are never accessed by the source VM. To prevent transferring pages that are actually not used, such pages are marked in the PSB as NEVER-ACCESSED pages.

When accessing the state of the memory pages in the PSB, the destination hypervisor acts accordingly:

EXTERNALIZED—request the page from the node in which the page is stored using the unique identifier of the page.

NEVER-ACCESSED—no need to request the page, allocate an empty page.

At a post-copy commitment step 242, all the memory pages have been successfully transferred, the source VM is now fully migrated, and the method then terminates.

In some cases, extracting the identifiers of the externalized pages, using the PSB, at step 234 above, increases the downtime between stopping VM_SRC 68 at step 234 and activating VM_DST at step 238, to an unacceptable duration. We now describe a variant of the post-copy method of FIG. 4, which includes iterative PSB copy phase 232 between steps 230 and 234 above, so that at least some of the transfers that depend of the PSB occur before the source VM stops. This variant method uses the following quadruple valued page state in the PSB:

RESET—an externalized page whose content was retrieved back in after the page identifier has been transferred.

EXTERNALIZED—request the page content from the node in which the page is stored using the unique identifier of the page.

NEVER-ACCESSED—the page has already been transferred, or is not used by the source VM.

STANDARD—a local page that has not been transferred yet.

In the enhanced post-copy method, at step 232, the source VM is still running, and the source hypervisor iteratively sends updated versions of the PSB to the destination node, which used the PSB information at step 238 as follows:

TRANSFERRED—allocate an empty page at the destination node.

EXTERNALIZED—request the page identifier from the source node.

RESET/STANDARD—initiate a page-fault to request the page content from the source VM.

The addition of step 232 to the method of FIG. 4, enables to reduce the phase of identifying and sending the externalized pages at step 234, and therefore reduces the downtime duration in which both VM_SRC 68 and VM_DST 72 are down, significantly.

Hybrid Live Migration

Figure 5:
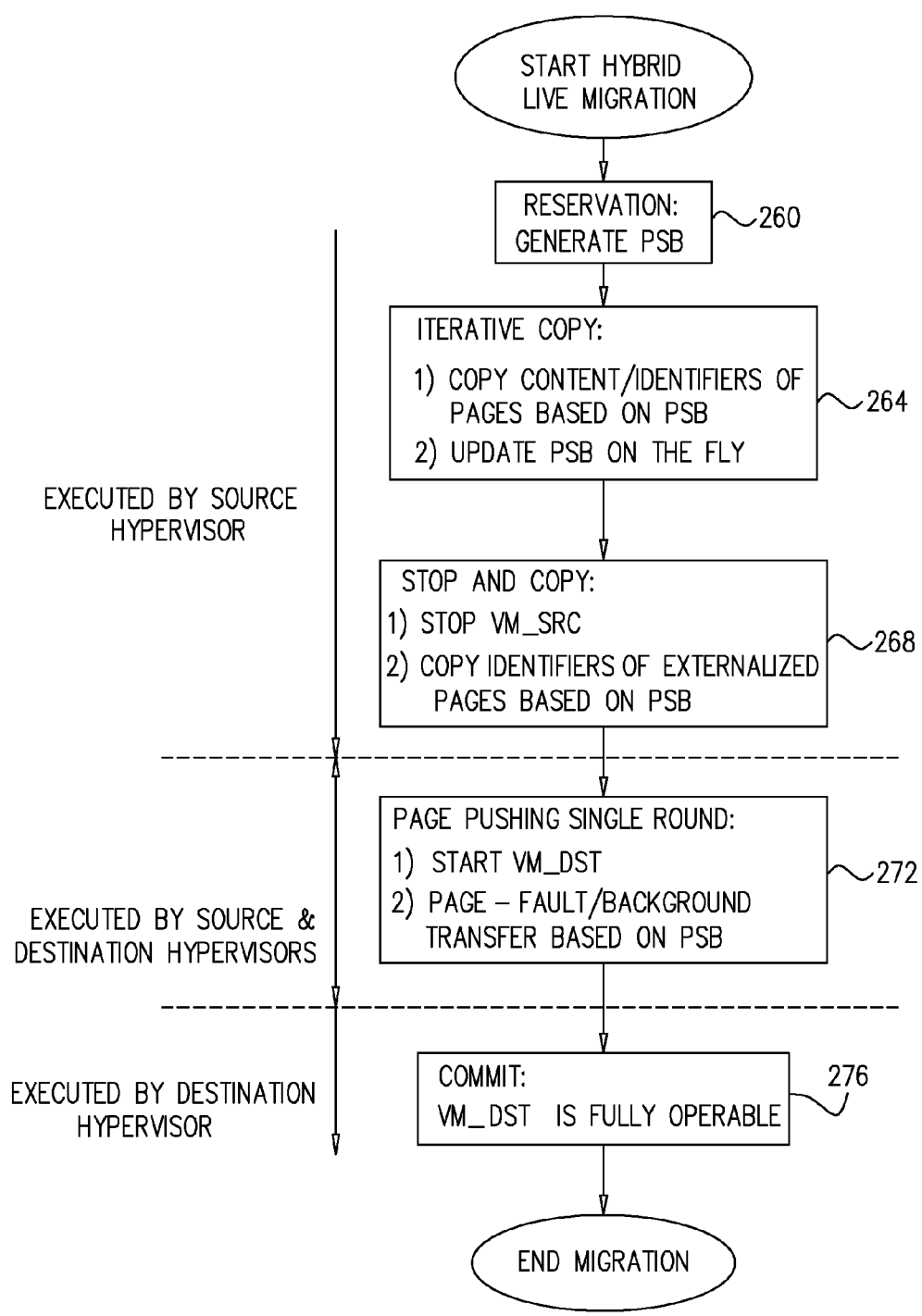
FIG. 5 is a flow chart that schematically illustrates a method for hybrid live migration of a virtual machine, in accordance with an embodiment of the present invention.

FIG. 5 is a flow chart that schematically illustrates a method for hybrid live migration of a virtual machine, in accordance with an embodiment of the present invention. The method merges the two previous methods to a combined method.

The method begins with source hypervisor 60 generating PSB structure 76, at a hybrid PSB generation step 260, similarly to steps 200 and 230 above. The source hypervisor then performs a hybrid iterative-copy step 264, which is similar to step 204 above. The source hypervisor can terminate the hybrid iterative-copy phase based on any suitable criteria, as described above.

At a hybrid stop-and-copy step 268, the source hypervisor stops the source VM, and transfers the unique identifiers of the externalized pages and CPU and I/O states to the destination node, similarly to step 234 above.

Next, the method performs a hybrid pushing step 272, which is similar to step 238 above. As described above with respect to step 238, at step 272 the destination VM may request from the source node missing pages that create page-fault events. The source hypervisor transfers pages in a background process, and in response to page requests from the destination hypervisor.

At a hybrid commitment step 276, the source VM turns fully migrated, and the destination hypervisor runs the migrated image VM_DST 72. The method then terminates.

In the methods of FIGS. 4 and 5, only identifiers of the externalized pages are transferred during the respective stop-and-copy steps 234 and 268. Since only the page identifiers are transferred (rather than actual page content, which is typically much larger), this reduces the downtime period significantly. Additionally, after starting the destination VM at respective steps 238 and 272, the probability of a double page-fault event created by the externalized pages is relatively low, and essentially does not reduce the performance.

Figure 6:
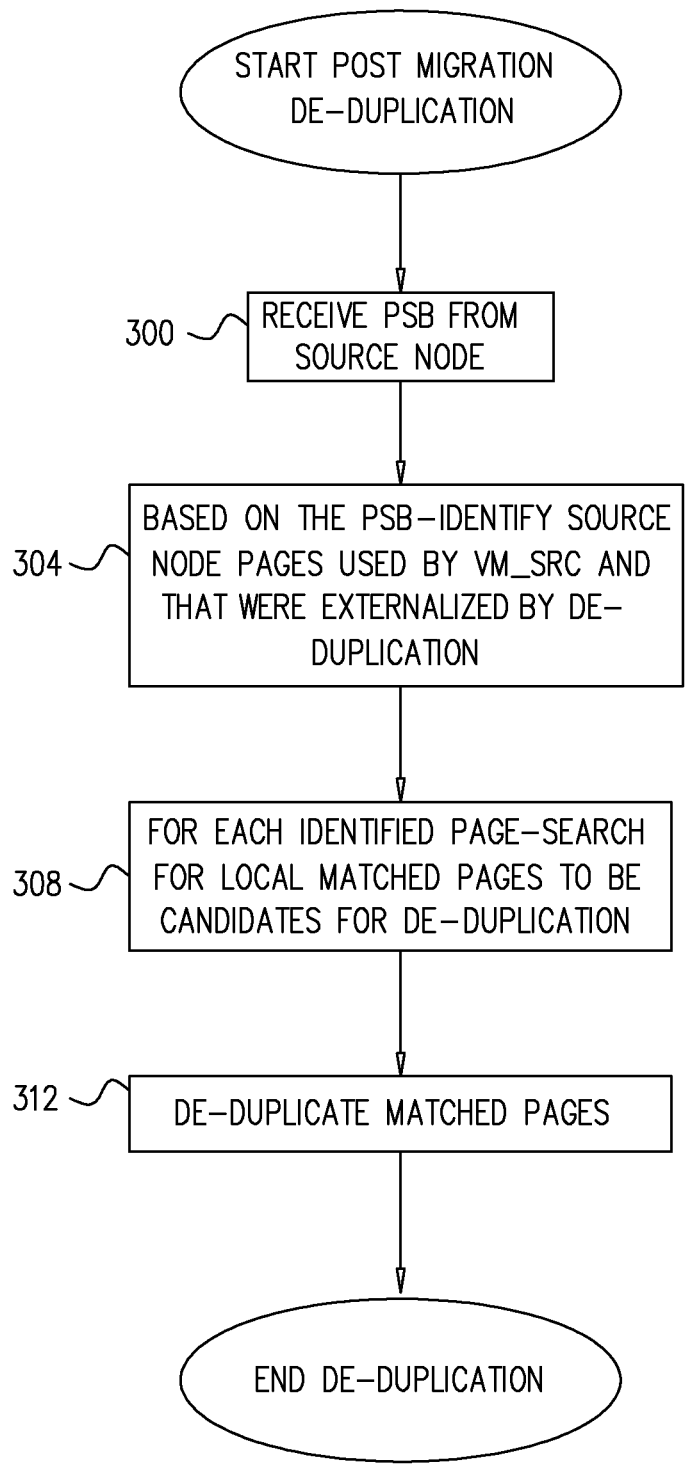
FIG. 6 is a flow chart that schematically illustrates a post migration de-duplication method, in accordance with an embodiment of the present invention.

FIG. 6 is a flow chart that schematically illustrates a post migration de-duplication method, in accordance with an embodiment of the present invention. The method may be executed at the destination node, for example, after the migration of a VM in which the externalized pages are retrieved back in, and transferred as local (possibly duplicated) pages to the destination node.

The method begins with destination hypervisor 60 receiving PSB 76 from the source node, at a PSB reception step 300. The PSB may be received, for example, as part of a migration commitment phase, in which the destination VM turns fully operable. While generating the PSB, the source VM should mark de-duplicated pages that were retrieved, e.g., using the unique fingerprint identifier of the page.

At a candidate identification step 304, the destination hypervisor scans the received PSB to identify the retrieved de-duplicated pages and are therefore now duplicated pages. At a matching step 308, the destination hypervisor matches duplicates for each identified page, using the page fingerprint identifier.

At a de-duplication step 312, the destination hypervisor applies de-duplication procedure to the matched duplicate pages. The de-duplication may depend on local and/or systemic de-duplication criteria. Following step 312, the method terminates.

Example Memory Sharing Architecture

Figure 7:
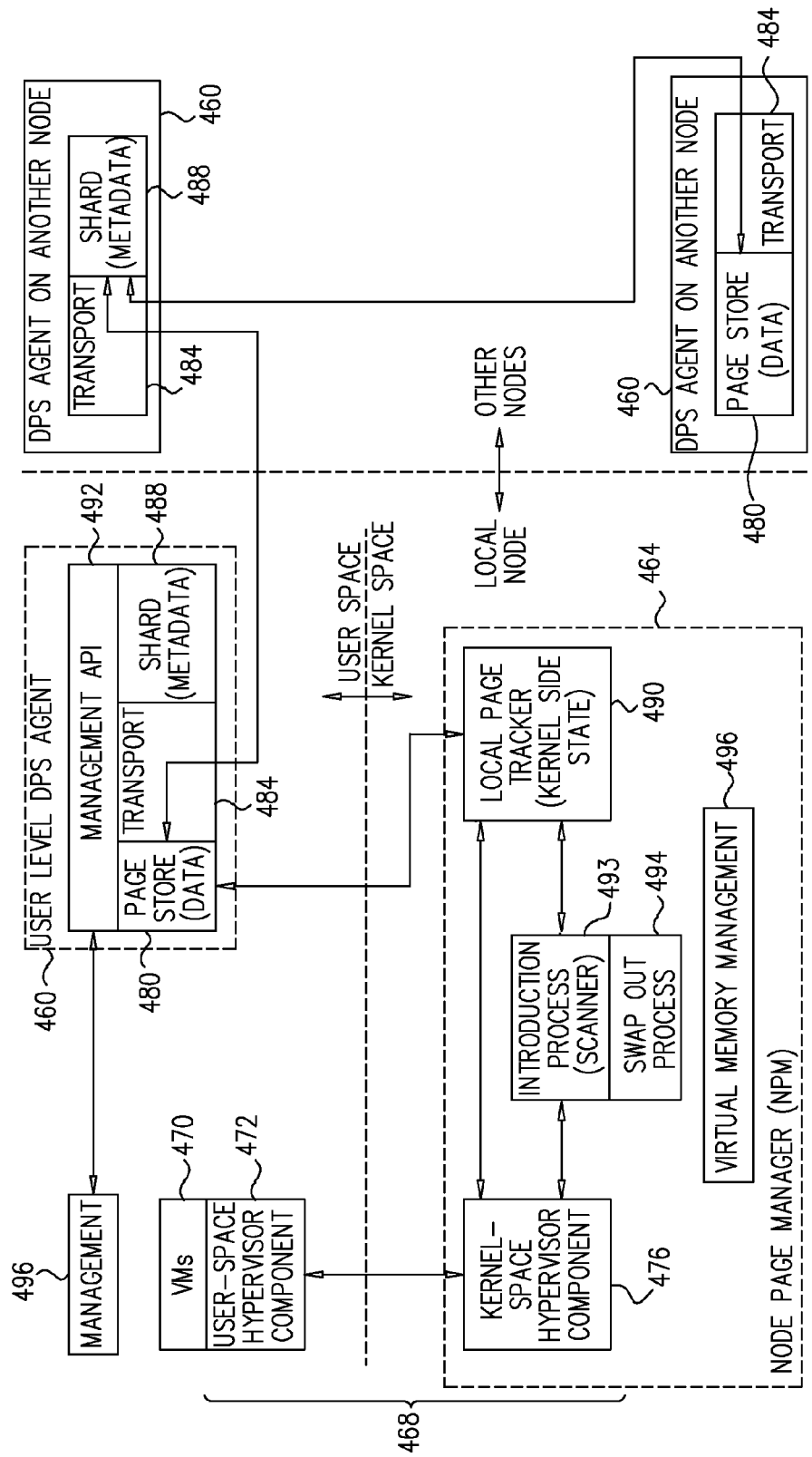
FIG. 7 is a diagram that schematically illustrates a distributed memory sharing architecture, in accordance with an embodiment of the present invention.

FIG. 7 is a diagram that schematically illustrates the distributed memory sharing architecture used in system 20, in accordance with an embodiment of the present invention. The architecture depicted in FIG. 7 additionally serves as an example implementation of a DPS network that can be used in the VM live migration embodiments described above. This architecture is addressed in greater detail in U.S. application Ser. No. 14/181,791, cited above.

The left-hand-side of the figure shows the components running on the CPU of a given node 24, referred to as a local node. Each node 24 in system 20 is typically implemented in a similar manner. The right-hand-side of the figure shows components of other nodes that interact with the local node.

In the local node (left-hand-side of the figure), the components are partitioned into a kernel space (bottom of the figure) and user space (top of the figure). The latter partitioning is mostly implementation-driven and not mandatory.

In the present example, each node runs a respective user-space DPS agent 460, similar in functionality to DPS agent 48 in FIG. 1 above, and a kernel-space Node Page Manager (NPM) 464. The node runs a hypervisor 468, which is partitioned into a user-space hypervisor component 472 and a kernel-space hypervisor component 476. In the present example, although not necessarily, the user-space hypervisor component is based on QEMU, and the kernel-space hypervisor component is based on Linux/KVM. Hypervisor 468 runs one or more VMs 470 and provides the VMs with resources such as memory, storage and CPU resources.

DPS agent 460 comprises three major components—a page store 480, a transport layer 484 and a shard component 488. Page store 480 holds the actual content (data) of the memory pages stored on the node. Transport layer 484 is responsible for communicating and exchanging pages with peer transport layers 484 of other nodes. A management Application Programming Interface (API) 492 in DPS agent 460 communicates with a management layer 496.

Shard 488 holds metadata of memory pages. The metadata of a page may comprise, for example, the storage location of the page and a hash value computed over the page content. The hash value of the page is used as a unique identifier that identifies the page (and its identical copies) cluster-wide. The hash value is also referred to as Global Unique Content ID (GUCID). Note that hashing is just an example form of signature or index that may be used for indexing the page content. Alternatively, any other suitable signature or indexing scheme can be used.

Jointly, shards 488 of all nodes 24 collectively hold the metadata of all the memory pages in system 20. Each shard 488 holds the metadata of a subset of the pages, not necessarily the pages stored on the same node. For a given page, the shard holding the metadata for the page is defined as "owning" the page. Various techniques can be used for assigning pages to shards. In the present example, each shard 488 is assigned a respective range of hash values, and owns the pages whose hash values fall in this range.

From the point of view of shard 488, for a given owned page, each node 24 may be in one of three roles:

"Origin"—The page is stored (possibly in compressed form) in the memory of the node, and is used by at least one local VM.

"Storage"—The page is stored (possibly in compressed form) in the memory of the node, but is not used by any local VM.

"Dependent"—The page is not stored in the memory of the node, but at least one local VM depends upon it and may access it at any time.

Shard 488 typically maintains three lists of nodes per each owned page—A list of nodes in the "origin" role, a list of nodes in the "storage" role, and a list of nodes in the "dependent" role. Each node 24 may belong to at most one of the lists, but each list may contain multiple nodes.

NPM 464 comprises a kernel-space local page tracker 490, which functions as the kernel-side component of page store 480. Logically, page tracker 490 can be viewed as belonging to DPS agent 460. The NPM further comprises an introduction process 493 and a swap-out process 494. Introduction process 493 introduces pages to the DPS network. Swap-out process 494 handles pages that are candidates for exporting to other nodes. A virtual memory management module 496 provides interfaces to the underlying memory management functionality of the hypervisor and/or architecture, e.g., the ability to map pages in and out of a virtual machine's address space.

The architecture and functional partitioning shown in FIG. 7 is depicted purely by way of example. In alternative embodiments, the memory sharing scheme can be implemented in the various nodes in any other suitable way.

The embodiments described above are presented by way of example, and other suitable embodiments can also be used. For example, the described partitioning into migration phases such as the iterative-copy, stop-and-copy and page pushing phases, is not mandatory, and in alternative embodiments, other migration phases and phase ordering can also be used.

As another example, in some embodiments, the source VM, destination VM or both can run a suitable background process for transferring the content or unique identifiers of at least some of the local and externalized memory pages during migration. For example, the source and destination VMs may apply push and pull transfers, respectively.

Although the embodiments described herein mainly address live VM migration, the methods and systems described herein can also be used in other applications, such as in such as in content migration within a distributed storage system. Adapting the disclosed techniques to such applications may involve replacing the VMs with storage devices, and the memory pages with a block of memory storage.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method, comprising:

running a Virtual Machine (VM) on a first compute node in a plurality of compute nodes that communicate with one another over a communication network; and migrating the VM from the first compute node to a second compute node in the plurality, by:

generating, for memory pages accessed by the VM, page transfer state of one or more local memory pages that are accessed locally on the first compute node, and of one or more externalized memory pages whose access is not confined to the first node;

based on the page transfer state, providing for the migrated VM access to the memory pages, including both the local and the externalized memory pages, on the second compute node; and transferring from the first compute node to the second compute node contents or unique identifiers of the local memory pages, further transferring from the first compute node to the second compute node unique identifiers of the externalized memory pages after stopping the VM on the first compute node, and transferring remaining memory pages after starting a migrated instance of the VM on the second compute node.

2. The method according to claim 1, wherein generating the page transfer state comprises assigning for each memory page a state selected from a group of states consisting of:
- a DIRTY state for a local page that has changed or for an externalized page that has been retrieved back to the first compute node after the page has been transferred to the second compute node;
- an EXTERNALIZED state for a page that resides outside the first compute node; and
- a TRANSFERRED state for a page that has been successfully transferred to the second compute node.

3. The method according to claim 1, wherein transferring the remaining memory pages comprises requesting the remaining memory pages in response to page-fault events occurring in the second compute node.

4. The method according to claim 1, wherein transferring the remaining memory pages comprises transferring the remaining memory pages in a background process.

5. The method according to claim 1, wherein migrating the VM comprises transferring at least part of the page transfer state from the first compute node to the second compute node before stopping the VM.

6. The method according to claim 1, wherein migrating the VM comprises transferring at least some of the contents or unique identifiers of the local memory pages, and unique identifiers of the externalized memory pages, using at least one of a push background process in the first compute node and a pull background process in the second compute node.

7. A method, comprising:
- running a Virtual Machine (VM) on a first compute node in a plurality of compute nodes that communicate with one another over a communication network; and
- migrating the VM from the first compute node to a second compute node in the plurality, by:
  - generating, for memory pages accessed by the VM, page transfer state of one or more local memory pages that are accessed locally on the first compute node, and of one or more externalized memory pages whose access is not confined to the first node;
  - based on the page transfer state, providing for the migrated VM access to the memory pages, including both the local and the externalized memory pages, on the second compute node;
  - transferring from the first compute node to the second compute node contents or unique identifiers of the local memory pages, and unique identifiers of the externalized memory pages,
  - wherein migrating the VM comprises transferring at least some of the memory pages while the VM is running on the first compute node, and transferring remaining externalized pages before starting a migrated instance of the VM on the second compute node.

8. A system comprising a plurality of compute nodes that communicate with one another over a communication network, including at least first and second compute nodes comprising respective processors, wherein the processors are configured to run a Virtual Machine (VM) on the first compute node and to migrate the VM from the first compute node to the second compute node, by:
- generating, for memory pages accessed by the VM, page transfer state of one or more local memory pages that are accessed locally on the first compute node, and of one or more externalized memory pages whose access is not confined to the first node; and
- based on the page transfer state, providing for the migrated VM access to the memory pages, including both the local and the externalized memory pages, on the second compute node,
- wherein the processors are further configured to transfer from the first compute node to the second compute node contents or unique identifiers of the local memory pages, and to further transfer from the first compute node to the second compute node unique identifiers of the externalized memory pages after stopping the VM on the first compute node, and to transfer remaining memory pages after starting a migrated instance of the VM on the second compute node.

9. The system according to claim 8, wherein the processors are configured to assign for each memory page a state selected from a group of states consisting of:
- a DIRTY state for a local page that has changed or for an externalized page that has been retrieved back to the first compute node after the page has been transferred to the second compute node;
- an EXTERNALIZED state for a page that resides outside the first compute node; and
- a TRANSFERRED state for a page that has been successfully transferred to the second compute node.

10. The system according to claim 8, wherein the processors are configured to request the remaining memory pages in response to page-fault events occurring in the second compute node.

11. The system according to claim 8, wherein the processors are configured to transfer the remaining memory pages in a background process.

12. The system according to claim 8, wherein the processors are configured to transfer at least part of the page transfer state from the first compute node to the second compute node before stopping the VM.

13. The system according to claim 8, wherein the processors are configured to migrate the VM by transferring at least some of the contents or unique identifiers of the local memory pages, and unique identifiers of the externalized memory pages, using at least one of a push background process in the first compute node and a pull background process in the second compute node.

14. A system comprising a plurality of compute nodes that communicate with one another over a communication network, including at least first and second compute nodes comprising respective processors, wherein the processors are configured to run a Virtual Machine (VM) on the first compute node and to migrate the VM from the first compute node to the second compute node, by:
- generating, for memory pages accessed by the VM, page transfer state of one or more local memory pages that are accessed locally on the first compute node, and of one or more externalized memory pages whose access is not confined to the first node; and
- based on the page transfer state, providing for the migrated VM access to the memory pages, including both the local and the externalized memory pages, on the second compute node, wherein the processors are further configured to transfer from the first compute node to the second compute node contents or unique identifiers of the local memory pages, and unique identifiers of the externalized memory pages, to transfer at least some of the memory pages while the VM is running on the first compute node, and to transfer remaining externalized pages before starting a migrated instance of the VM on the second compute node.

15. A computer software product, the product comprising a tangible non-transitory computer-readable medium in which program instructions are stored, which instructions, when read by processors of first and second compute nodes that communicate with one another over a communication network, cause the processors to run a Virtual Machine (VM) on the first compute node and to migrate the VM from the first compute node to the second compute node, by:

- generating, for memory pages accessed by the VM, page transfer state of one or more local memory pages that are accessed locally on the first compute node, and of one or more externalized memory pages whose access is not confined to the first node;
- based on the page transfer state, providing for the migrated VM access to the memory pages, including both the local and the externalized memory pages, on the second compute node; and
- transferring from the first compute node to the second compute node contents or unique identifiers of the local memory pages, further transferring from the first compute node to the second compute node unique identifiers of the externalized memory pages after stopping the VM on the first compute node, and transferring remaining memory pages after starting a migrated instance of the VM on the second compute node.

* * * * *